US011731494B2

(12) United States Patent
Slack

(10) Patent No.: US 11,731,494 B2
(45) Date of Patent: Aug. 22, 2023

(54) VEHICLE DOOR ASSEMBLY

(71) Applicant: NISSAN NORTH AMERICA, INC., Franklin, TN (US)

(72) Inventor: Robert T Slack, Nolensville, TN (US)

(73) Assignee: Nissan North America, Inc., Franklin, TN (US)

( * ) Notice: Subject to any disclaimer, the term of this patent is extended or adjusted under 35 U.S.C. 154(b) by 173 days.

(21) Appl. No.: 17/181,851

(22) Filed: Feb. 22, 2021

(65) Prior Publication Data

US 2022/0266663 A1     Aug. 25, 2022

(51) Int. Cl.
*B60J 5/04*     (2006.01)

(52) U.S. Cl.
CPC ........... *B60J 5/0402* (2013.01); *B60J 5/0408* (2013.01)

(58) Field of Classification Search
CPC ............................. B60J 5/0402; B60J 5/0408
See application file for complete search history.

(56) References Cited

U.S. PATENT DOCUMENTS

| | | | | |
|---|---|---|---|---|
| 9,180,757 | B2 * | 11/2015 | Huber | B60J 5/0408 |
| 9,649,921 | B2 * | 5/2017 | Bessho | E05D 15/165 |
| 10,000,111 | B2 * | 6/2018 | Makita | B60J 5/0402 |
| 10,583,716 | B2 * | 3/2020 | Bito | B60J 5/0402 |
| 10,696,244 | B2 * | 6/2020 | Bito | B60J 10/75 |
| 11,453,280 | B2 * | 9/2022 | Petit | B60R 13/0206 |
| 2009/0183435 | A1 | 7/2009 | Daio et al. | |
| 2009/0195013 | A1 | 8/2009 | Suzuki et al. | |
| 2020/0122558 | A1 * | 4/2020 | Seong | B60J 10/21 |

* cited by examiner

*Primary Examiner* — Jason S Morrow
(74) *Attorney, Agent, or Firm* — Global IP Counselors, LLP

(57) ABSTRACT

A vehicle door assembly includes a first molding, a second molding and an end cap. The first molding is configured to be installed to a first door component. The second molding is configured to be installed to a second door component. The first and second moldings at least partially define a vehicle window opening. The end cap supports an end of the first molding to an end of the second molding. The end cap has an extension extending across a gap at least partially defined by the first and second moldings to fill the gap.

19 Claims, 7 Drawing Sheets

VEHICLE DOOR ASSEMBLY

BACKGROUND

Field of the Invention

The present invention generally relates to a vehicle door assembly. More specifically, the present invention relates to a vehicle door assembly having an end cap for a vehicle door component.

Background Information

A sash (window frame) that extends along the outer peripheral edge portion of a door window glass for supporting the glass is provided at the door window glass of a vehicle such as an automobile. It has been known that a designed (decorative) molding is attached to the sash in order to enhance appearance quality.

A vehicle door assembly can be equipped with a door sash in which substantially an entire door sash main body is covered by a molding and a weather strip. The door sash molding and a weather strip can cover the door sash main body so that the door sash main body is not exposed to the outside. The door sash can at least partially define a window pane opening that receives a window pane of the vehicle door assembly.

SUMMARY

In view of the state of the known technology, one aspect of the present disclosure is to provide a vehicle door assembly comprising a first molding, a second molding and an end cap. The first molding is configured to be installed to a first door component. The second molding is configured to be installed to a second door component. The first and second moldings at least partially define a vehicle window opening. The end cap supports an end of the first molding to an end of the second molding. The end cap has an extension extending across a gap at least partially defined by the first and second moldings to fill the gap.

Also other objects, features, aspects and advantages of the disclosed vehicle door assembly will become apparent to those skilled in the art from the following detailed description, which, taken in conjunction with the annexed drawings, discloses one embodiment of the vehicle door assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
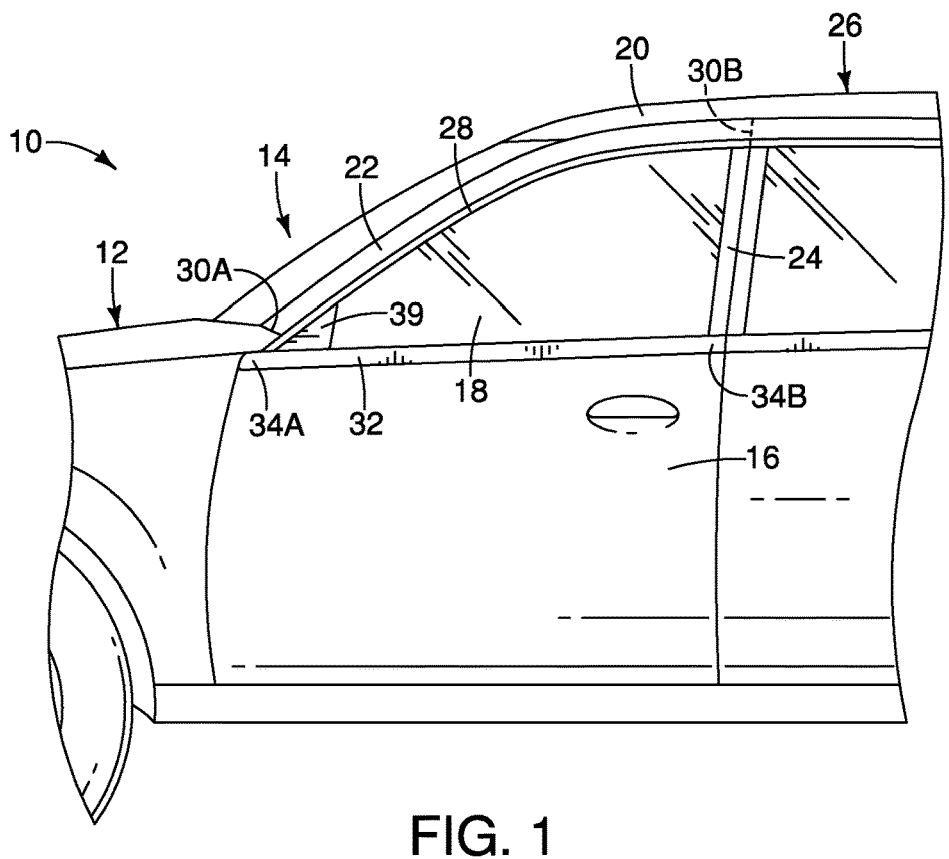
FIG. 1 is a side view of a portion of a vehicle equipped with a vehicle door assembly in accordance with an illustrated embodiment.

Referring initially to FIG. 1, a portion of a vehicle 10 is illustrated, comprising a vehicle body 12 that supports a vehicle door assembly 14. The vehicle 10 includes the vehicle door assembly 14. As shown in FIG. 1, the vehicle door assembly 14 comprises a door panel 16, a window pane 18, a side roof frame 20, a door A-pillar 22, and a door B-pillar 24. The side roof frame 20 forms a side end of the vehicle's roof 26 and extends in a longitudinal (i.e., front to rear) direction of the vehicle 10. The door A-pillar 22 and the door B-pillar 24 are supported to the door panel 16 to together define a window pane opening W with the side roof frame 20. The window pane 18 is a plate-like tempered glass that is installed within the window pane opening W. Therefore, the window pane 18 is fitted to the window pane opening W.

Figure 3:
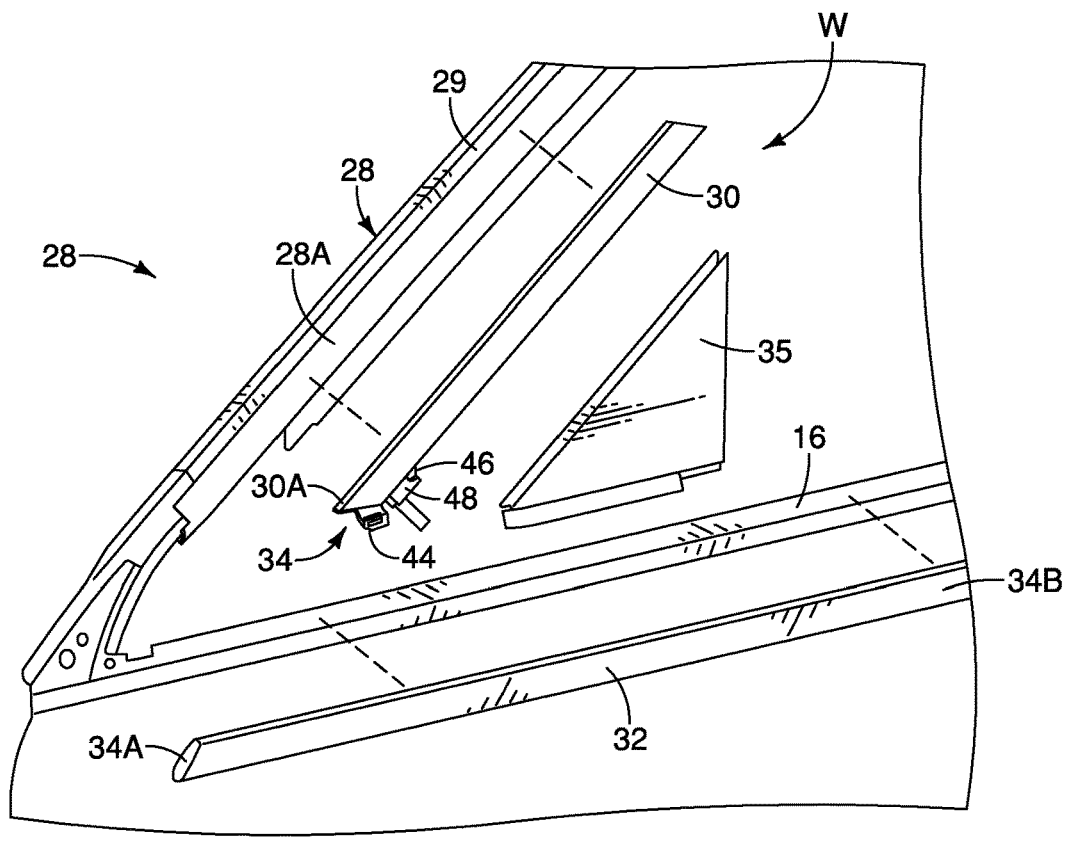
FIG. 3 is an exploded view of the vehicle door assembly showing a door sash and an end cap of the vehicle door assembly.

The door A-pillar 22 is defined by a door sash 28, as will be further described below. The door sash includes a door sash main body 29 and a door sash molding 30, as seen in FIG. 3. Therefore, the vehicle door assembly 14 includes the door sash main body 29 and the door sash molding 30. The door sash main body 29 defines a first door component of the illustrated embodiment. Therefore, the first door component of the illustrated embodiment is the door sash main body 29. Therefore, in the illustrated embodiment, the vehicle door assembly 14 includes a first molding (e.g., the door sash molding 30) that is configured to be installed to the first door component (e.g., the door sash main body 29). The door panel 16 defines a second door component of the illustrated embodiment. Therefore, the second door component of the illustrated embodiment is the door panel 16 of the vehicle door assembly 14.

The vehicle door assembly 14 further includes a waist molding 32 that can be considered a second molding of the illustrated embodiment. The door sash molding 30 is installed to the door sash main body 29 of the door sash 28, as will be further discussed below. In the illustrated embodiment, the second molding is the waist molding 32 that is installed to the door panel 16, as will be further discussed. Therefore, the waist molding 32 is configured to be installed to the second door component (e.g., the door panel 16), as seen in FIG. 3. In the illustrated embodiment, the door sash molding 30 and the waist molding 32 are both deformable trim members provided to the first and second door components to help protect the first and second door components against wear and tear. The vehicle door assembly 14 further comprises an end cap 34 that fastens the door sash molding 30 to the waist molding 32, as will be further described below.

Figure 4:
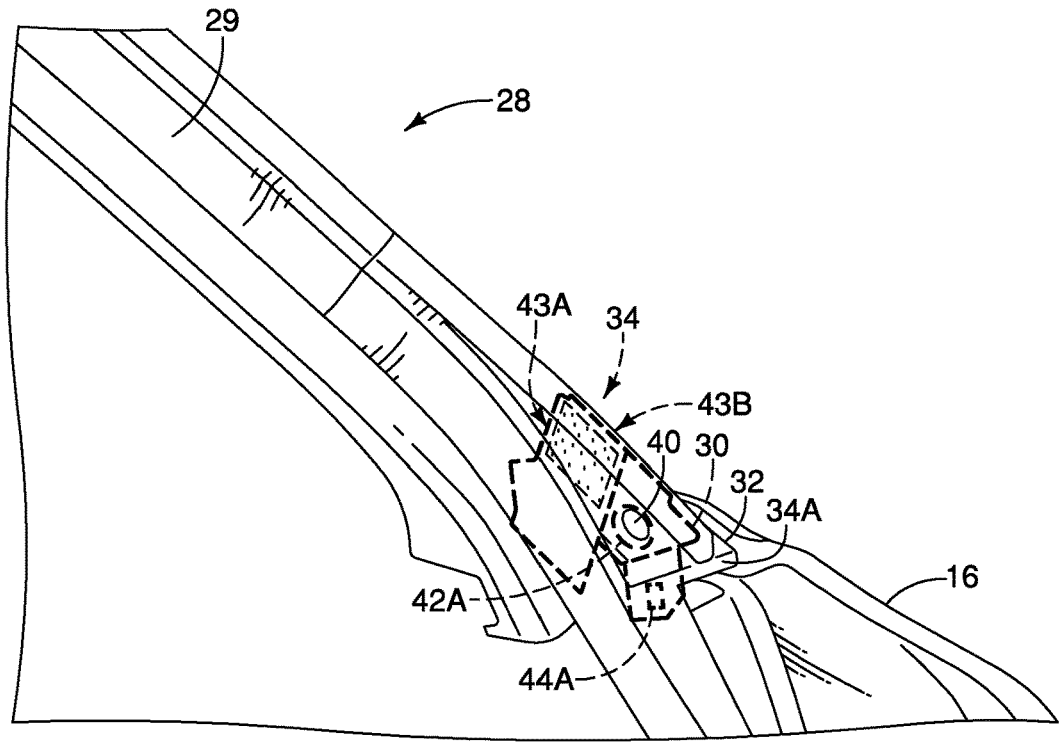
FIG. 4 is an inside view of the vehicle door assembly with the end cap installed between a door sash main body and a door sash molding.
Figure 5:
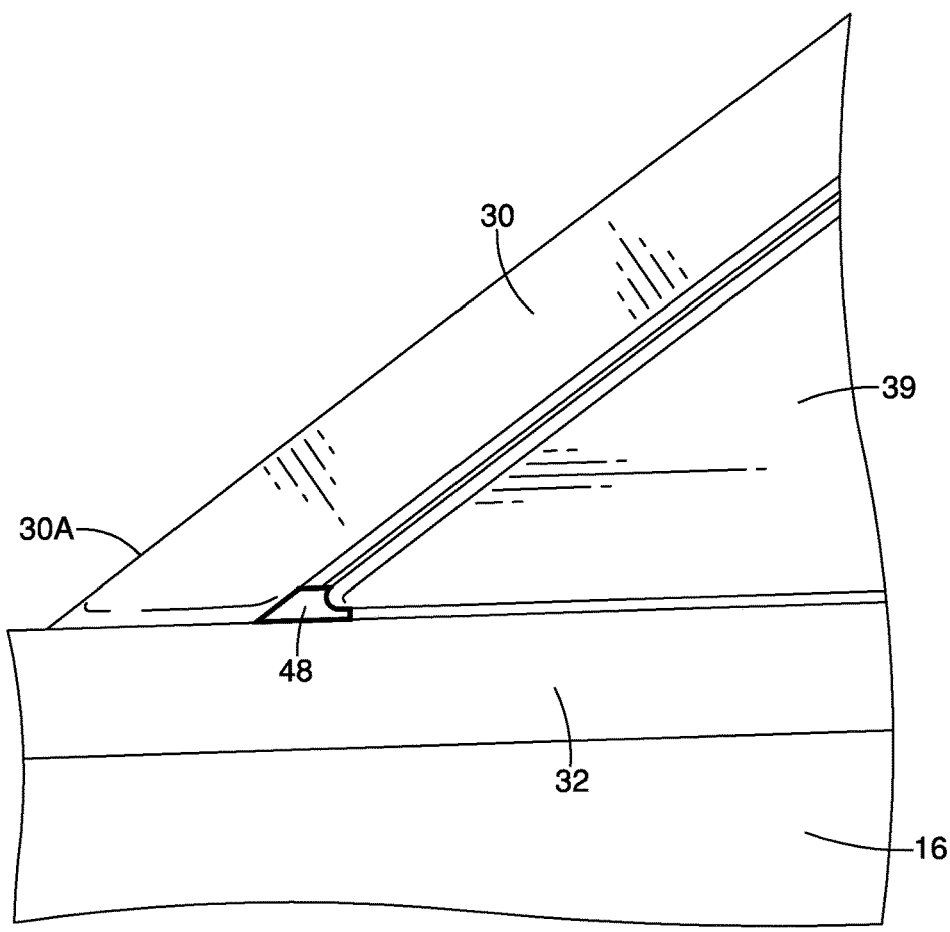
FIG. 5 is an outside view of the vehicle door assembly in which the end cap covers the gap that was shown in FIG. 2.

The door sash molding 30 and the waist molding 32 together at least partially define the vehicle window pane opening W of the vehicle door assembly 14. In the illustrated embodiment, the end cap 34 is installed to the door sash molding 30. More preferably, as best seen in FIGS. 4 and 5, the end cap 34 is installed to both the door sash molding 30 and the waist molding 32 to support the door sash molding 30 and the waist molding 32 with respect to each other in the vehicle door assembly 14. In particular, the end cap 34 of the illustrated embodiment is supported to the door sash molding 30 and the waist molding 32 to cover a space (e.g., gap G) that is between the door sash molding 30 and the waist molding 32, as will be further described below.

Figure 6:
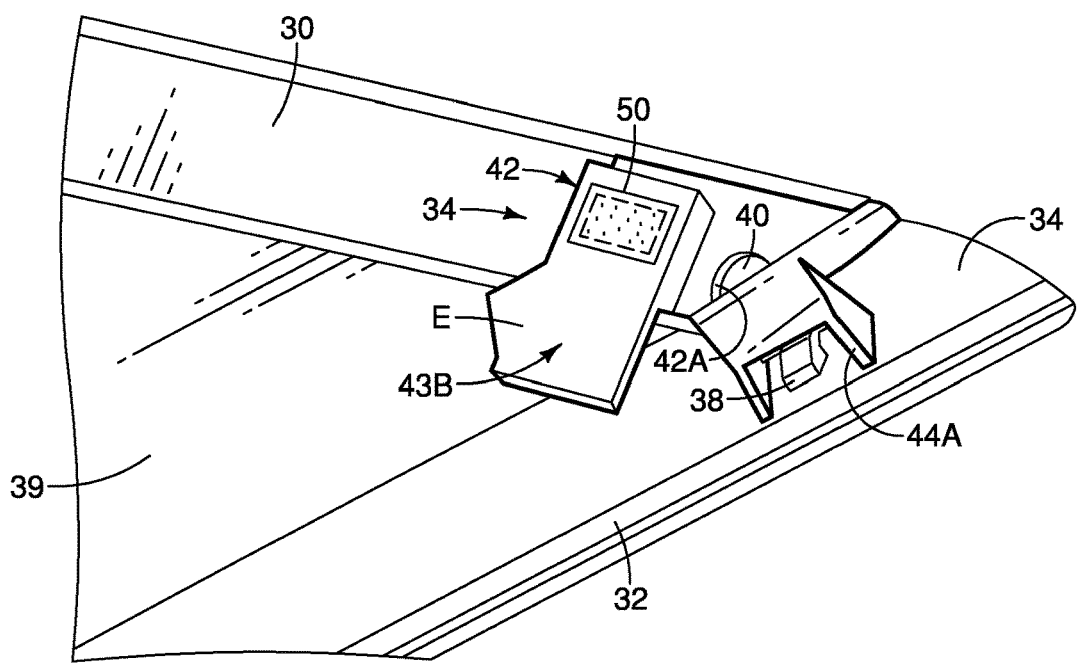
FIG. 6 is an inside view of the end cap installed to the door sash molding and a waist molding of the vehicle door assembly.

As best seen in FIGS. 3 and 6, the vehicle door assembly 14 further comprises a corner cover 35 that is fitted to the vehicle window pane opening W. The corner cover 35 helps maintain the window pane 18 within the window pane opening W. In particular, the corner cover 35 is an A-pillar corner cover 35 that is installed between the door sash molding 30 and the waist molding 32 when the corner cover 35 is fitted into the window pane opening W. The corner cover 35 is attached to the door sash molding 30 and the waist molding 32 when installed to the vehicle door assembly 14. The corner cover 35 preferably snaps to the door sash molding 30 and the waist molding 32 in a conventional manner.

Figure 2:
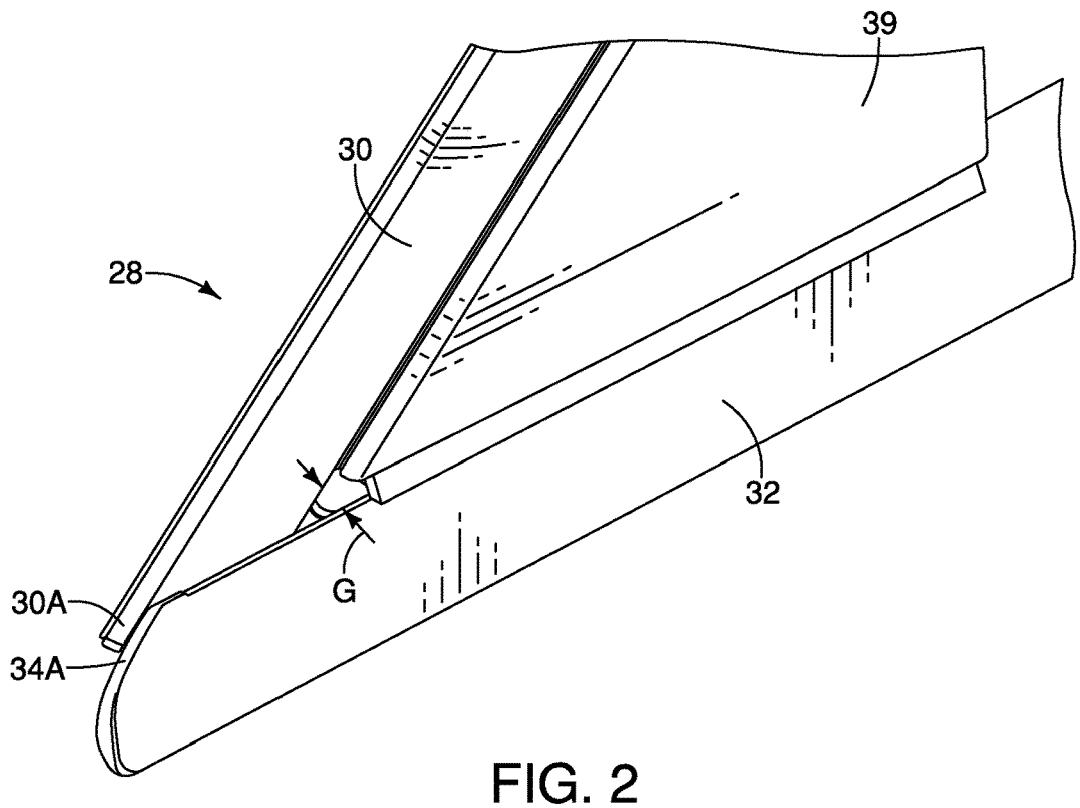
FIG. 2 is an enlarged view of a vehicle door assembly showing a gap between components of the vehicle door assembly.

As best seen in FIG. 2, the gap G between the door sash molding 30 and the waist molding 32 is located at a forward portion of the vehicle window pane opening W. More specifically, as seen in FIGS. 2 and 5, the gap G is defined by the door sash molding 30, the waist molding 32 and the corner cover 35. As stated, the end cap 34 covers the gap G. However, it will be apparent to those skilled in the vehicle field from this disclosure that the corner cover 35 is optional and that the vehicle door assembly 14 can be provided without the corner cover 35 such that the window pane opening W is defined by the door sash molding 30 and the waist molding 32. In this arrangement, the gap G can be defined by the door sash molding 30, the waist molding 32 and the window pane 18. Therefore, it will be apparent to those skilled in the vehicle field from this disclosure that the end cap 34 can cover a gap G that is defined by the door sash molding 30, the waist molding 32 and the window pane 18.

The door sash is supported to the door panel 16 via the end cap 34 and the waist molding 32, as will be further discussed below. As best seen in FIGS. 1 and 3, the door sash 28 therefore partially serves as a window frame for the window pane 18 in the vehicle door assembly 14. In particular, the door sash 28 serves as an upper portion of the window frame for the window pane 18. As shown in FIG. 3, the door sash 28 and the waist molding 32 define the window pane opening W for the window pane 18. More preferably, in the illustrated embodiment, the door sash 28 and the waist molding 32 define the window pane opening W together with the corner cover 35.

Referring to FIGS. 3 and 4, the door sash main body 29 is a rigid frame-like member that extends along an upper edge of the window pane 18 to support the window pane 18 in the window pane opening W. The door sash molding 30 is installed to the door sash main body 29 to cover an outboard side 28A of the door sash main body 29, as best seen in FIG. 3. In the illustrated embodiment, "outboard" refers to a side or direction facing the vehicle's 10 exterior. The door sash molding 30 is a designed (decorative) component provided by a molding that extends substantially along the door sash 28 and is arranged being exposed to the outside of the vehicle 10. The door sash molding 30 can also support a weather strip (not shown) to the vehicle door assembly 14 to prevent intrusion of water into the inner cabin.

As best seen in FIGS. 3 and 4, the door sash molding 30 is installed to an outboard facing side 28A of the door sash main body 29. The door sash molding 30 includes a first end 30 that is a forward end 30A and a second end that is a rearward end 30B, as shown in FIG. 1. The forward end 30A is positioned closer to a front of the vehicle 10 with respect to the rearward end 30B. The end cap 34 is attached to the forward end 30A of the door sash molding 30. In particular, as seen in FIGS. 7 to 9, the end cap 34 is detachably attached to the forward end 30A where the end cap 34 to support the forward end 30A of the door sash molding 30 to the waist molding 32.

In the illustrated embodiment, the term "forward end" refers to a forward end area of the referenced component including the forward end of the component and the area and/or portion of the component directly adjacent within the vicinity of the forward end. In the illustrated embodiment, the term "rearward end" refers to a rearward end area of the referenced component including the rearward end of the component and the area and/or portion of the component directly adjacent within the vicinity of the rearward end.

As seen in FIGS. 3 and 4, the waist molding 32 is installed to an upper end of the door panel 16 to serve as a sliding member against the window pane 18. The waist molding 32 is a deformable trim molding provided along the upper end of the vehicle door panel 16 to help support the window pane 18 to the door panel 16. Preferably, the waist molding 32 is press fit to the metal of the door panel 16 in a conventional manner. The waist molding 32 helps enhance the appearance of the vehicle door assembly 14 and also helps protect the upper edges of the door panel 16 against wear and tear. As seen in FIGS. 1 and 2, the waist molding 32 includes a first end that is a forward end 34A and a second end that is a rearward end 34B. The forward end 34A is positioned closer to the vehicle's 10 front end with respect to the rearward end 34B.

Figure 7:
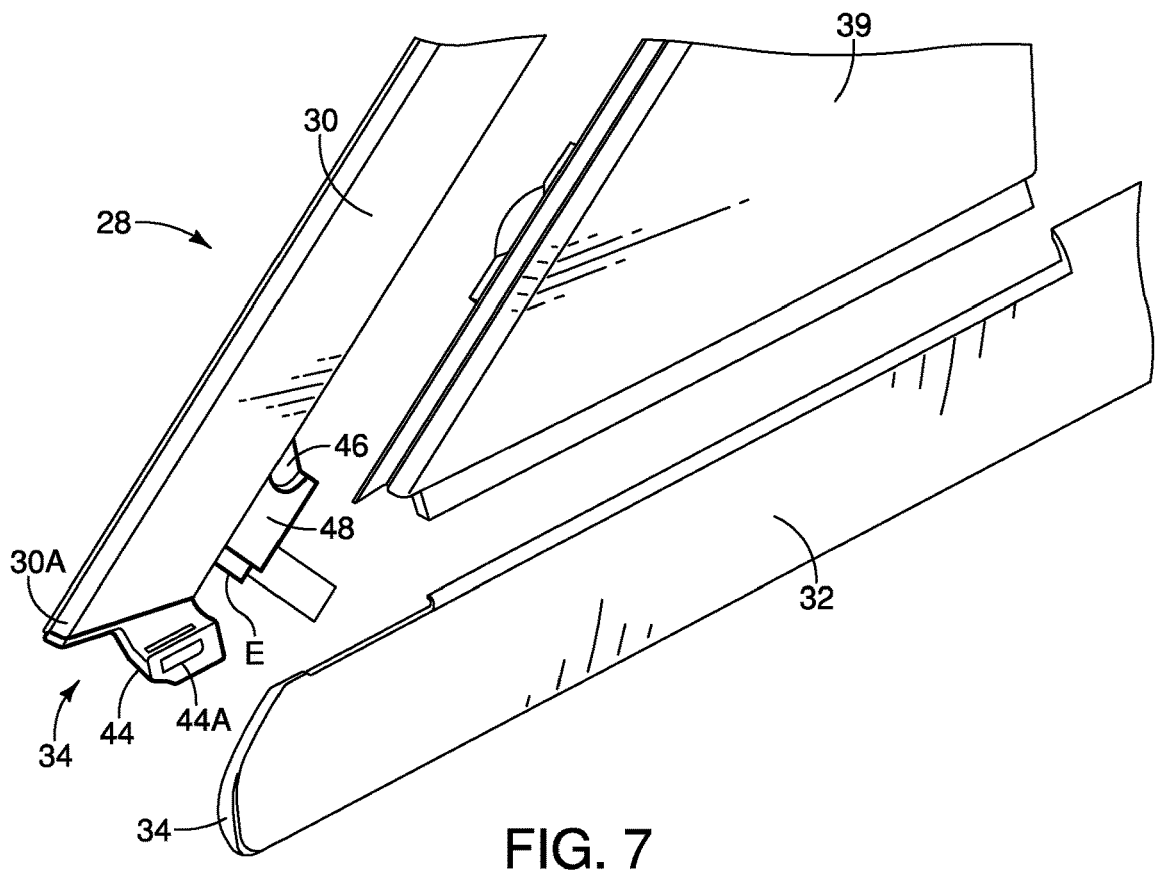
FIG. 7 is an exploded view of some of the components of the vehicle door assembly.
Figure 8:
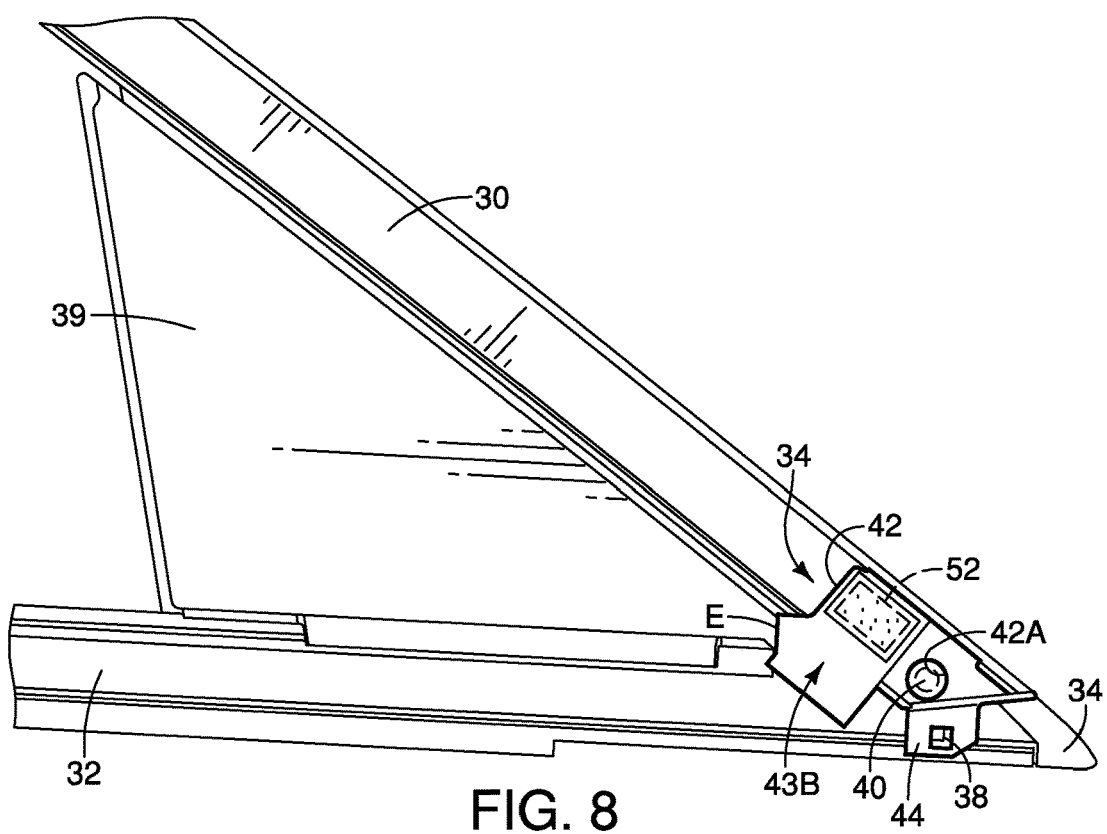
FIG. 8 is an inboard view of the components of the vehicle door assembly of FIG. 7 with the components an installed state.
Figure 9:
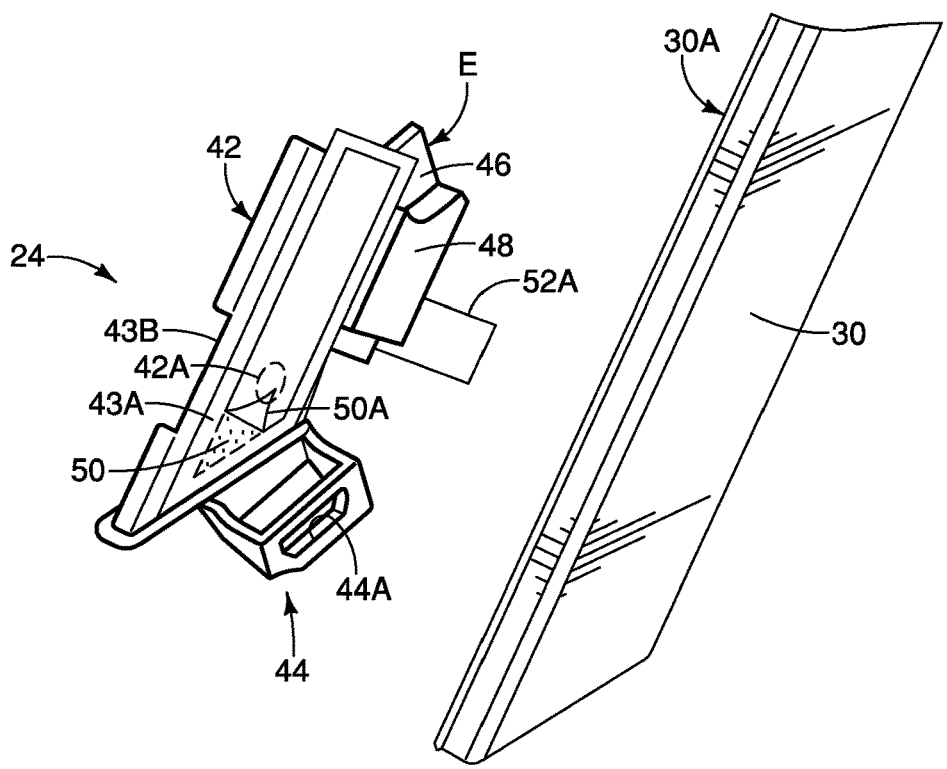
FIG. 9 is an exploded view of the end cap and the door sash molding.

As seen in FIGS. 6 to 8, the end cap 34 is secured to the forward end 34A of the waist molding 32. Preferably, the end cap 34 snaps to the forward end 34A of the waist molding 32 in a conventional manner. As shown, the waist molding 32 includes a projection 38 that is received by the end cap 34. As seen in FIGS. 6 and 8, the projection 38 is on an inboard side of the waist molding 32. The door sash molding 30 also includes a projection 40 at the forward end 30A of the door sash molding 30 that is received by the end cap 34, as will be further discussed below. The projection 40 of the door sash molding 30 is also on an inboard facing side 30C of the door sash molding 30, as seen in FIG. 8. In the illustrated embodiment, "inboard" refers to a side or direction facing towards the vehicle's 10 interior or the vehicle cabin.

Therefore, the end cap 34 supports the forward end 30A of the door sash molding 30 to the forward end 34A of the waist molding 32. The end cap 34 is made of a rigid material having a hardness higher than the door sash molding 30 and the waist molding 32. For example, the end cap 34 can be made of resin, such as polypropylene, polyethylene, and polyamide. The end cap 34 can alternatively be made of metals such as steel, stainless, and aluminum. As seen in FIGS. 8 to 13, the end cap 34 has an extension E that extends across the gap G to fill the gap G when the end cap 34 is installed to the other components of the vehicle door assembly 14.

In the illustrated embodiment, the end cap 34 is attached to the door sash molding 30, preferably by snap fit. The sash molding is then assembled to the door sash molding 30 body via the end cap 34. The waist molding 32 is thereafter attached to the end cap 34, preferably by snap-fit. The corner cover 35 is then installed between the door sash 28 and the waist molding 32. In the installed state, the end cap 34 extends between the gap G formed by the door sash molding 30, the waist molding 32 and the corner cover 35.

Figure 10:
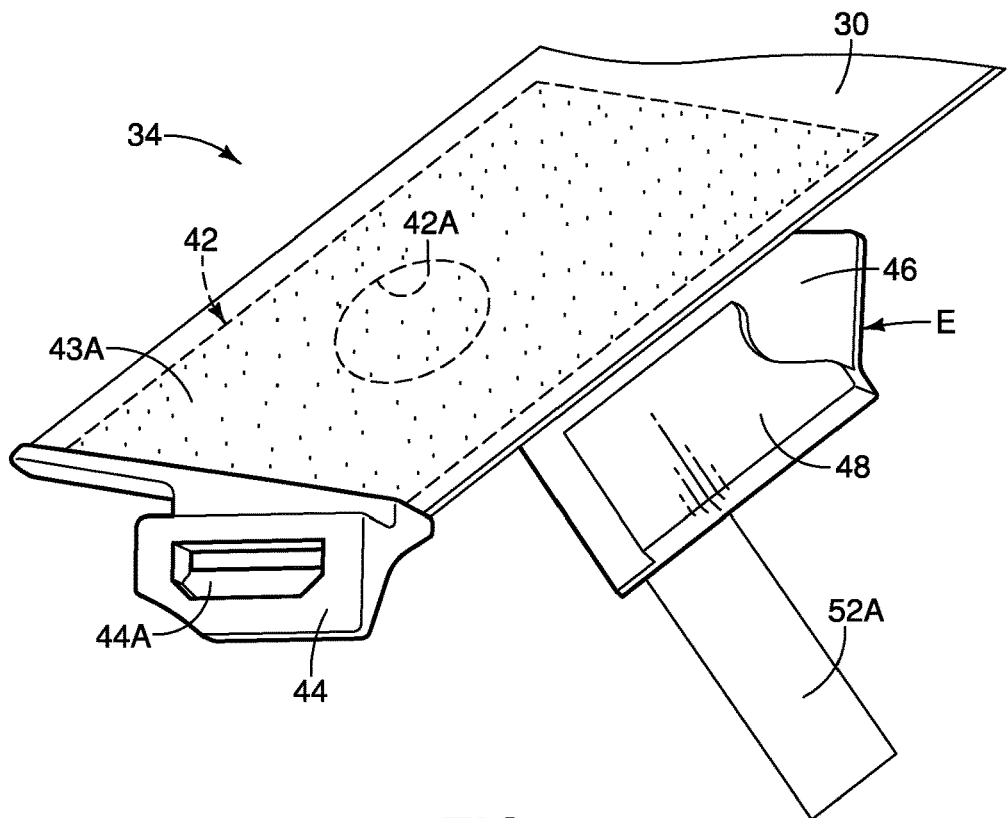
FIG. 10 is an outboard view of the door sash molding with the end cap installed thereon.
Figure 11:
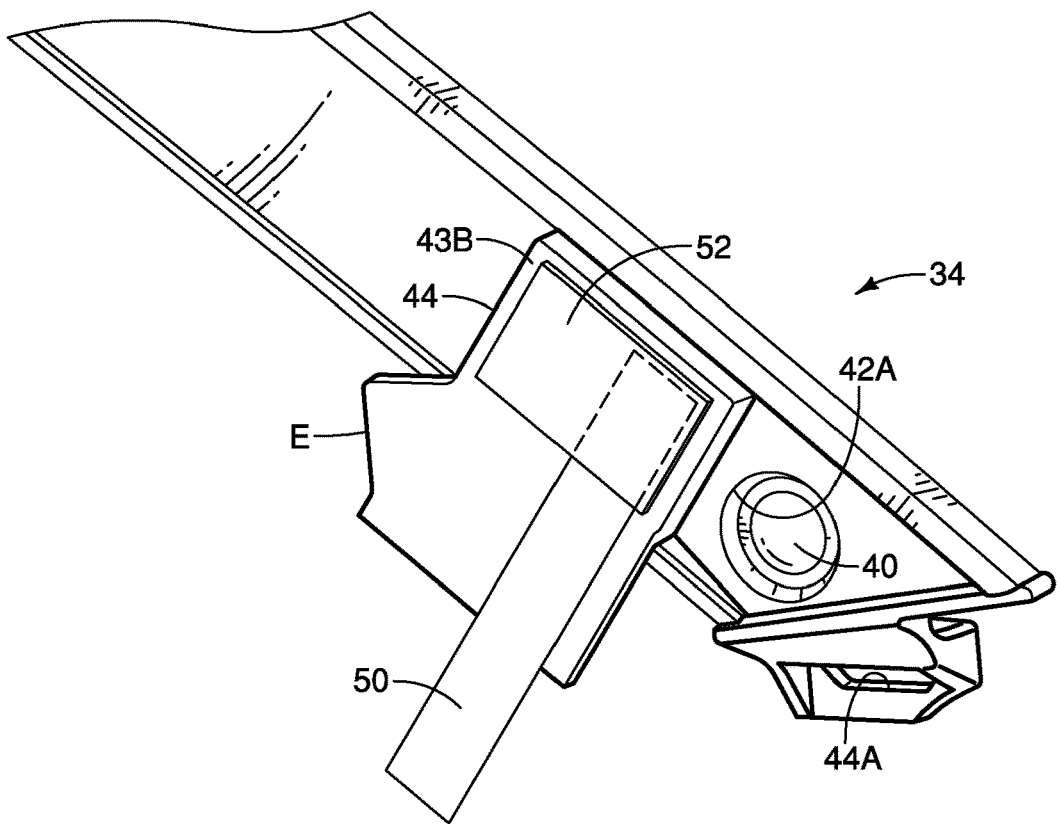
FIG. 11 is an inboard view of the door sash molding with the end cap installed thereon.
Figure 12:
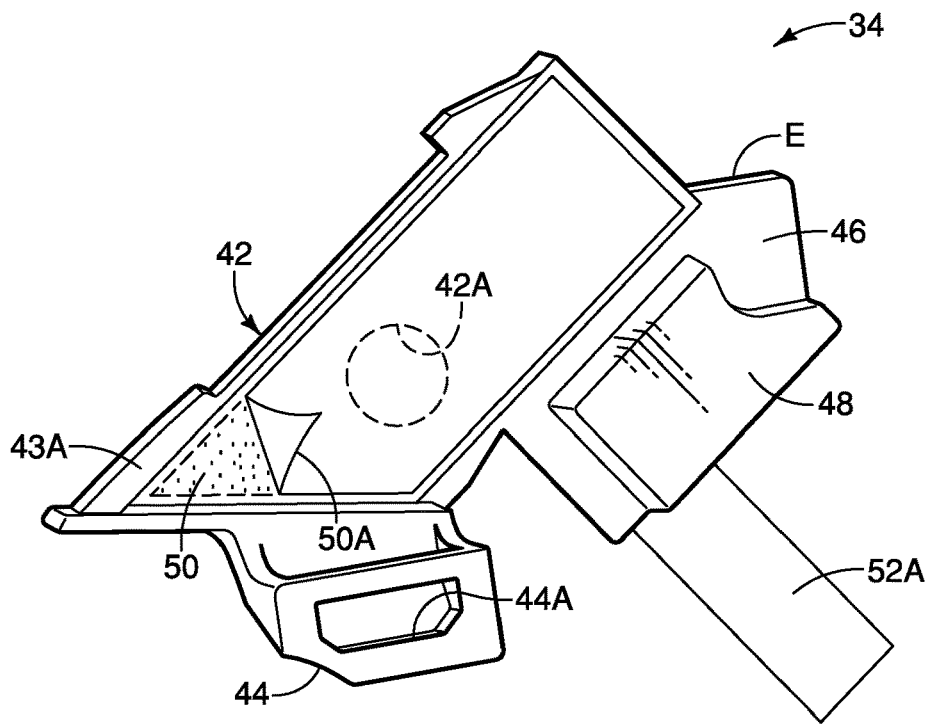
FIG. 12 is a outboard view of the end cap.

As seen in FIGS. 7 to 12, the end cap 34 includes a first molding attachment part 42 that is installed to the door sash molding 30. The end cap 34 includes a second molding attachment part 44 that is installed to the waist molding 32. As best seen in FIGS. 10 and 11, the second molding attachment part 44 is cantilevered in the outboard direction with respect to the first molding attachment part 42 in order to contact the waist molding 32.

As seen in FIG. 4, the first molding attachment part 42 is sandwiched between the door sash and the door sash molding 30. Therefore, the end cap 34 is sandwiched between the door sash main body 29 and the door sash molding 30. As seen in FIGS. 6, 8 and 10 to 13, the first molding attachment part 42 includes an opening 42A for receiving a fastener (e.g., the projection 40) of the door sash molding 30. In particular, the opening 42A of the first molding attachment part 42 receives the projection 40 of the door sash molding 30 so that the projection 40 snap fits to the end cap 34. It will be apparent to those skilled in the vehicle field from this disclosure that the end cap 34 can include additional fastener receiving structures to receive additional fasteners of the door sash molding 30 to secure the end cap 34 to the door sash 28. Therefore, the first molding attachment part 42 includes at least one opening 42A for receiving a fastener (e.g., the projection 40) of the door sash molding 30.

The second molding attachment part 44 includes an opening 44A for receiving a fastener of the waist molding 32. In particular, the opening receives 44A the projection 38 of the waist molding 32. The extension E of the end cap 34 extends in an outboard direction with respect to the first molding attachment part 42 when the end cap 34 is installed to the door sash molding 30. As best seen in FIGS. 9 to 13, the extension E has a base 46 that extends from the first molding attachment part 42. Preferably, the base 46 is integrally attached to the first molding attachment part 42. The extension E includes an outboard extending extrusion 48 that fills the gap G. The extrusion 48 projects in the outboard direction from the base 46. That is, the base 46 is recessed with respect to the extrusion 48.

As best seen in FIG. 4, the extrusion 48 contacts the door sash molding 30, the waist molding 32 and the corner cover 35 when the end cap 34 is installed. Preferably, the extrusion 48 has a thickness that is approximately equal to the thickness of the gap G. That is, the extrusion 48's thickness is approximately equal to a distance between the forward end 30A of the door sash molding 30 and the forward end 34A of the waist molding 32 to fill the gap G. More preferably, the extrusion 48's thickness is approximately equal to a thickness of the corner cover 35.

Figure 13:
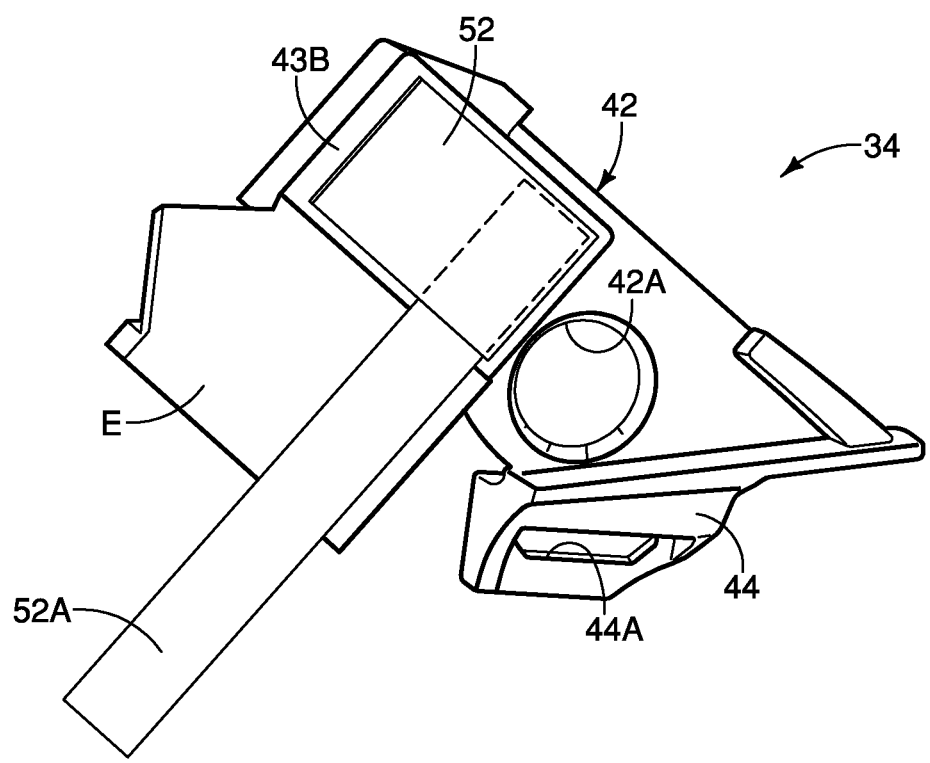
FIG. 13 is an inboard view of the end cap.

As seen in FIG. 13, the vehicle door assembly 14 further comprises a first adhesive 50 and a second adhesive 52. The first adhesive 50 is provided between the end cap 34 and the door sash molding 30. Therefore, the first adhesive 50 is provided to an outboard side 43A of the end cap 34, as best seen in FIG. 9. In particular, the first adhesive 50 is provided to the outboard side 43A at the first molding attachment part 42.

As best seen in FIG. 5, the first adhesive 50 is provided between the first molding attachment part 42 and the door sash molding 30. The first adhesive 50 of the end cap 34 fixes the door sash molding 30 to the door sash main body 29. The first adhesive 50 has a cover 50A that is removable to expose an adhesive side. In particular, the first adhesive 50 is preferably a double-sided tape with the removable cover 50A to expose the adhesive parts of the first adhesive 50. The two sides of the first adhesive 50 are applied to the first molding attachment part 42 at a first side and to the door sash molding 30 at a second side to help attach the end cap 34 to the door sash molding 30, as shown in FIG. 9.

As best seen in FIG. 5, the second adhesive 52 is provided between the end cap 34 and the door sash main body 29. In particular, the second adhesive 52 provided between the first molding attachment part 42 and the door sash main body 29 to support the end cap 34 to the door sash main body 29. In this way, the end cap 34 supports the door sash molding 30 to the door sash main body 29. The second adhesive 52 is applied between the first molding attachment part 42 and the door sash main body 29 at an inboard side 43B of the first molding attachment part 42 of the end cap 34, as shown in FIG. 8. In particular, the second adhesive 52 is also preferably a double-sided tape with a removable cover (shown as a removable strip 52A) to expose the adhesive parts of the second adhesive 52. The two sides of the second adhesive 52 are applied to the inboard 43B side of the first molding attachment part 42 at a first side of the second adhesive 52, and to the door sash molding 30 at a second side of the second adhesive 52 to help attach the end cap 34 to the door sash molding 30, as shown in FIG. 8.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
a first molding configured to be installed to a first door component;
a second molding configured to be installed to a second door component, the first and second moldings at least partially defining a vehicle window opening; and
an end cap supporting an end of the first molding to an end of the second molding, the end cap having an extension extending across a gap at least partially defined by the first and second moldings to fill the gap, the end cap extending around a corner edge between the first molding and the second molding.

2. The vehicle door assembly according to claim 1, wherein
the first door component is a door sash main body and the first molding is a door sash molding.

3. The vehicle door assembly according to claim 2, wherein
the second door component is a door panel and the second molding is a waist molding.

4. A vehicle door assembly comprising:
a first molding configured to be installed to a first door component, the first door component being a door sash main body and the first molding is a door sash molding;
a second molding configured to be installed to a second door component, the first and second moldings at least partially defining a vehicle window opening, the second door component being a door panel and the second molding is a waist molding;
an end cap supporting an end of the first molding to an end of the second molding, the end cap having an extension extending across a gap at least partially defined by the first and second moldings to fill the gap; and
a corner cover installed between the door sash molding and the waist molding, the gap being defined by the door sash molding, the waist molding and the corner cover.

5. The vehicle door assembly according to claim 4, wherein
the end cap includes a first molding attachment part that is installed to the door sash molding, and a second molding attachment part that is installed to the waist molding.

6. The vehicle door assembly according to claim 5, wherein the extension extends in an outboard direction with respect to the door sash attachment part when the end cap is installed to the door sash molding.

7. The vehicle door assembly according to claim 6, wherein
the second molding attachment part is cantilevered in the outboard direction with respect to the door sash attachment part.

8. The vehicle door assembly according to claim 7, wherein
the extension includes an outboard extending extrusion that fills the gap.

9. The vehicle door assembly according to claim 8, wherein
the extrusion contacts the door sash molding, waist molding and the corner cover when the end cap is installed.

10. The vehicle door assembly according to claim 7, wherein
the first molding attachment part includes at least one opening for receiving a fastener of the door sash molding, and the second molding attachment part includes at least one opening for receiving a fastener of the waist molding.

11. The vehicle door assembly according to claim 3, further comprising
the door sash main body, the door sash molding being installed to an outboard facing side of the door sash main body.

12. A vehicle door assembly comprising:
a first molding configured to be installed to a first door component, the first door component being a door sash main body and the first molding is a door sash molding, the door sash molding being installed to an outboard facing side of the door sash main body;
a second molding configured to be installed to a second door component, the first and second moldings at least partially defining a vehicle window opening, the second door component being a door panel and the second molding is a waist molding; and
an end cap supporting an end of the first molding to an end of the second molding, the end cap having an extension extending across a gap at least partially defined by the first and second moldings to fill the gap,
the end cap being sandwiched between the door sash main body and the door sash molding.

13. The vehicle door assembly according to claim 11, further comprising
the door panel, the waist molding being installed to an upper end of the door panel.

14. The vehicle door assembly according to claim 11, further comprising
a first adhesive provided between the end cap and the door sash molding.

15. The vehicle door assembly according to claim 14, further comprising
a second adhesive provided between the end cap and the door sash main body.

16. The vehicle door assembly according to claim 11, wherein
the end cap includes a first molding attachment part that is installed to the door sash molding, and a second molding attachment part that is installed to the waist molding.

17. The vehicle door assembly according to claim 16, wherein
the first molding attachment part is sandwiched between the door sash main body and the door sash molding and the second molding attachment part extends in an outboard direction with respect to the first molding attachment part.

18. The vehicle door assembly according to claim 16, further comprising
a first adhesive provided between the first molding attachment part and the door sash molding.

19. The vehicle door assembly according to claim 18, further comprising
a second adhesive provided between the first molding attachment part and the door sash main body.

* * * * *